Nov. 25, 1930.  R. L. HILL  1,782,850
METHOD OF PURIFYING WATER AND APPARATUS THEREFOR
Filed May 8, 1926
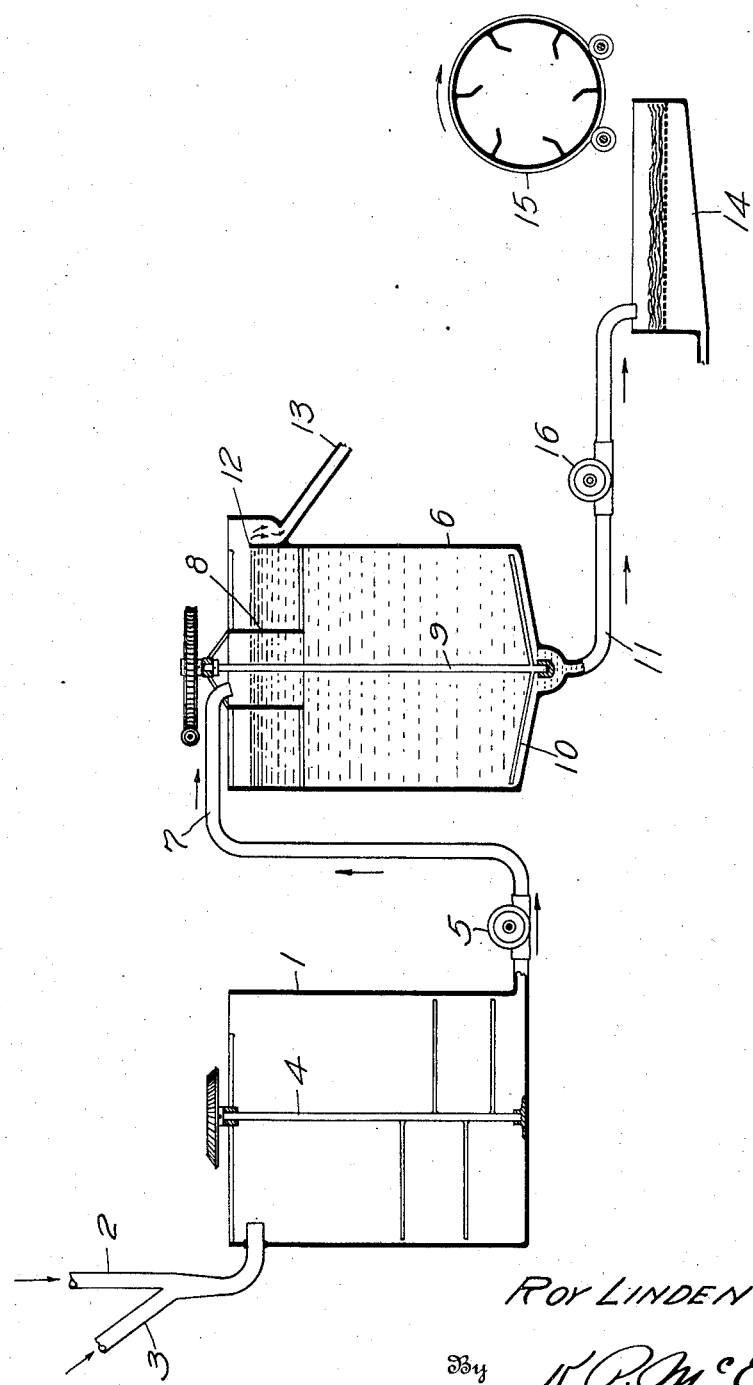
Inventor
ROY LINDEN HILL,
By K. P. McElroy,
Attorney

Patented Nov. 25, 1930

1,782,850

UNITED STATES PATENT OFFICE

ROY LINDEN HILL, OF TAMAQUA, PENNSYLVANIA, ASSIGNOR TO DARCO CORPORATION, OF WILMINGTON, DELAWARE, A CORPORATION OF DELAWARE

METHOD OF PURIFYING WATER AND APPARATUS THEREFOR

Application filed May 8, 1926. Serial No. 107,687.

This invention relates to methods of purifying water and apparatus therefor; and it comprises a method of freeing potable water of foreign taste, odor, color and bacterial content, without materially interfering with the inherent taste, wherein such water is admixed with a small proportion of activated carbon, the proportion not exceeding 0.2 per cent of the weight of water and often being as little as 0.05 per cent, the admixture of water and carbon is then subjected to stirring in a manner to give accelerated settling with separation of clear water and activated carbon, the latter then being regenerated for reuse; and it also comprises as an organization of apparatus elements, means for admixing water with a limited amount of fine activated carbon, accelerated settling means for separating carbon from the treated water and regenerating means for restoring the properties of the carbon; all as more fully hereinafter set forth and as claimed.

Natural waters frequently contain organic impurities giving them unpleasant taste and odor. It is a desideratum to be able to free potable waters of this foreign taste and odor, as well as of the bacterial content, without interfering materially with the inherent or natural taste of the water. These waters contain small amounts of mineral salts and of dissolved gases which give the natural taste wanted in drinking water. I have found that I can accomplish this end, the purification of the water without rendering the water unpalatable, by using activated carbon in a certain way. Activated carbon is a material produced by cleaning out the pores of ordinary forms of carbon in certain ways and is characterized by enormously enhanced adsorbing powers as compared with ordinary forms of carbon. It is largely used in decolorizing sugar solutions because of its adsorbent properties. I have found that when used with potable water, it takes out objectionable foreign tastes, color and odor, even when used in extremely small proportions; and with these small proportions, it does not abstract mineral matters and gases to a sufficient extent to interfere with palatability of the treated water. So to speak, the activated carbon can be used to relieve the impure water of foreign taste and odor with a release of the natural taste. It has the further enormous practical advantage that for some reason it also frees the water of bacteria, entirely or practically entirely. While the carbon has no bactericidal power whatever, it does in some way collect and remove the bacteria.

The practical difficulty however arises in the use of activated carbon for the described purposes and in the described way, that it is quite difficult to free the water again of the added carbon. These carbons are ordinarily very fine and in some waters tend to go into a suspension which resists settling actions for an impractically long time. Nor can the suspended carbon be readily filtered out. Either settling or filtration can be aided by an addition of kieselguhr or diatomite (diatomaceous earth), but this addition, while desirable in and of itself, does not solve the difficulty. The use of the carbon still remains impracticable.

I have found however that with a certain type of stirring which will produce an accelerated settling action, the use of activated carbon for the described purpose and with the production of the described advantages becomes practicable. Without it, that is with natural settling, it is impracticable, using any ordinary type of apparatus, because of the properties of fine activited carbon suspended in water. All commercial carbons of this kind contain considerable proportions of extremely fine particles which in water assume a Brownian motion. Because of their fineness and their motion, in suspension they tend to follow Perrin's law, not settling out as a body but merely displaying different concentration at different levels with some carbon at all levels. The net result is that it is difficult to secure water free from a blackish cloudiness with any reasonable period of settling or any reasonable height of settling vessel with conditions producing practically complete quiescence. But if, instead of trying to secure quiescence of the liquid to cause settling, I give the body of liquid in the settling vessel a slow rotational movement, say, of the order of one or two turns per hour, I find that settling is sufficiently accelerated to permit a practical use of the extremely advantageous properties of activated carbon in treated water. In the practical use of my new process I have found that the angular velocity of rotation required to give accelerated settling is substantially independent of the diameter of the tank. By this expedient I find that I can produce a continuous flow of water to, through and past the apparatus, using apparatus of reasonable size and shape, with an outflow of clear, colorless water. While the accelerated settling is advantageous in a batch operation, it may also be used in continuous operation.

In the accompanying illustration I have shown, more or less diagrammatically, certain apparatus which may be employed in performing the stated process. In this showing, the figure is a central vertical section of a complete apparatus, certain parts being shown in elevation.

The apparatus comprises a tank-like mixing chamber 1 of any suitable size. It may be, as shown, a tank or cistern of iron or steel or wood. To it is fed water to be purified through inlet conduit 2. Activated carbon in the correct amount may be added to the inflowing water through Y-connection 3, or simply dumped into the tank. Within the tank is mounted bladed stirring mechanism 4 rotated from any suitable source of power (not shown). As shown, water containing admixed suspended carbon is taken away from the bottom of the tank by centrifugal pump 5 and delivered to a second piece of apparatus an accelerated settler 6. This it enters through feed conduit 7 which discharges into a short axial sleeve 8 located at the top of the tank and depending from a point somewhat above the water level to a point somewhere below. Through this axial sleeve passes shaft 9 actuating a slowly revolving stirrer 10 located at the bottom of the tank. This slowly revolving stirrer thickens the accumulated settlings. They are taken from an axial bottom point through conduit 11. At a point somewhat above the bottom end of the axial sleeve, clear water will occur and this flows past dam 12 into conduit 13, whence it is taken to a place of use, not shown. The thickened settlings from the bottom of the tank ordinarily carry about 75 per cent of water. They are taken to appropriate draining and drying means 14, shown as a suction box, and thence to regenerating oven 15, where the carbon is heated to a temperature sufficient to char organic matters taken from the water; this temperature being ordinarily about 700° C. Access of air should be prevented during this heating, in order to avoid loss of carbon. After this charring, the material is ready to be used again; to re-enter the cycle.

While I have described this invention more particularly in its application to the treatment of potable water for freeing the same of undesirable taste, odor and color, with restoration of the natural taste yet it may also be used for similarly purifying waste waters of various kinds, and particularly those coming from various factories, such as the effluents from dye plants and the like.

And while I have described revivification of the carbon by heating, which I regard as the simplest way, yet revivification may be accomplished by the use of sterilizing chemicals such as chlorin. The use of chlorin has the advantage of obviating the necessity of drying and heating.

In my method of operation as more particularly described the decolorizing carbon is used with water in small amount, separated and revivified for use. It is possible to employ the same carbon several times before revivification and this is sometimes convenient. Sometimes the water contains so little impurity that even a small addition of carbon does not have its activity exhausted. Commonly, however, when I contemplate using carbon a plurality of times between revivifications I employ somewhat larger amounts. For example carbon may be added to water, separated by accelerated settling and then returned to the apparatus for mixture with more water. Sometimes, in so doing, it is advisable to disinfect the carbon with a little chlorin before return.

What I claim is:—

1. In the purification of water, the process which comprises mixing a natural water with a very small amount of activated carbon and afterwards giving the water containing suspended carbon a slow rotational velocity of the order of one or two turns per hour about the axis of a cylindrical tank to produce an accelerated settling of said carbon.

2. The process of purifying water by activated carbon with cyclic reuse of said carbon which comprises intimately admixing water to be purified with minimal proportions of fine activated carbon, forming an upper layer of purified water above the body of the mixture of water and carbon by imparting to the body of water a slow motion of rotation of the order of one or two turns per hour about the axis of a cylindrical tank, removing the upper layer of purified water from the mixture, removing the major portion of the fine carbon from the residual body of water, regenerating the carbon for reuse and returning to water to serve anew.

3. In the purification of water, the cyclic process which comprises intimately admixing water to be purified with minimal proportions of fine activated carbon, forming an upper layer of purified water above the body of the mixture of water and carbon by imparting to the body of the water a slow angular velocity of the order of one or two turns per hour about the axis of a cylindrical tank, removing the upper layer of purified water from the mixture, removing the major portion of the fine carbon from the lower layer of the mixture, disinfecting the carbon by chlorin and returning the same to the untreated water in completion of the cycle.

4. In the purification of water, the process which comprises mixing a natural water with between 0.05 and 0.2 per cent of activated carbon and afterwards giving the water containing suspended carbon a slow rotational velocity of between one and two turns per hour about the axis of a cylindrical tank, in order to produce an accelerated settling.

In testimony whereof, I have hereunto affixed my signature.

ROY LINDEN HILL.